No. 647,790. Patented Apr. 17, 1900.
A. ANZELEWITZ.
DEVICE FOR SECURING SCARF PINS, &c.
(Application filed June 6, 1899.)

(No Model.)

WITNESSES:
E. Wolff
Chas E Rosengren

INVENTOR:
Abraham Anzelewitz.
BY
Hauff & Hauff
ATTORNEYS.

UNITED STATES PATENT OFFICE.

ABRAHAM ANZELEWITZ, OF NEW YORK, N. Y.

DEVICE FOR SECURING SCARF-PINS, &c.

SPECIFICATION forming part of Letters Patent No. 647,790, dated April 17, 1900.

Application filed June 6, 1899. Serial No. 719,604. (No model.)

*To all whom it may concern:*

Be it known that I, ABRAHAM ANZELEWITZ, a subject of the Czar of Russia, residing at New York, borough of Manhattan, in the county and State of New York, have invented new and useful Improvements in Devices for Securing Scarf-Pins and other Articles, of which the following is a specification.

By means of this invention a safety device or fastener is obtained which is of simple construction and which is easy or comfortable for the wearer; and the invention resides in the novel features of construction set forth in the following specification and claims and illustrated in the annexed drawings, in which—

Figure 1:
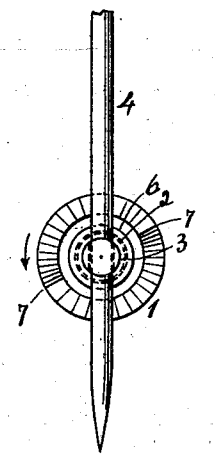
Figure 3:
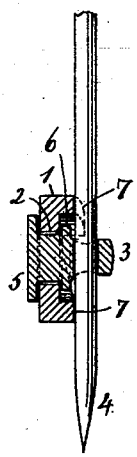
Figure 2:
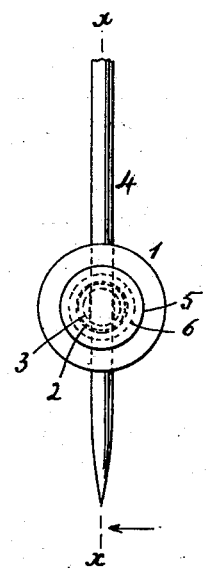

Figure 1 is a face view of a fastener or safety device. Fig. 2 is a rear view of Fig. 1. Fig. 3 is a section along $x\,x$, Fig. 2.

By having a fastener or safety device of flat form it will sit comfortably or not disturb the wearer of such articles as scarf-pins or studs. In the drawings is shown a flat base or plate with a locking eye or hook.

In the drawings the base 1 is shown perforated or ring-shaped and having a rotary hook or eye comprising a stud or pivot portion 2 and the eye or engaging portion 3 for the pin or shank 4 of an article such as a screw-stud or scarf-pin. The pivot 2 has the shoulder or rivet parts 5 and 6, which prevent the pivot coming out of or separating from the base, while allowing the pivot to rotate. The plate or base is provided with a locking-incline 7. Two such inclines are shown in the face view, Fig. 1. When the pin or shank 4 is passed into pivot 2 and the base 1 then rotated to bring a high part of incline 7 to or against the pin, the latter is jammed or locked, so that the pin and safety device will not separate. In other words, the pin is protected against loss or theft when on the wearer and engaged by such safety device. The face of the incline 7 can be smooth and has been found to afford security; but by denting or fluting the face of the locking-incline 7 such teeth or roughenings offer security against the plate or disk 1 accidentally rotating to releasing position.

The device can be made of only two pieces, so as to be cheap and simple, the base 1 and stem or engaging portion 2 forming the safety device. The locking-eye or engaging portion 3 is shown with an opening in the direction of or parallel to the plane of the base 1, so that the shank 4 lies along or parallel to the base and not across or through the latter. The shank 4 sitting close to and parallel with the flat base the device is not apt to incommode the wearer.

What I claim as new, and desire to secure by Letters Patent, is—

1. A ring 1, and a perforated stud 2 made to rotate but incapable of longitudinal motion in the ring, said ring having an inclined face made to lock a pin or shank 4 in the stud, substantially as described.

2. A ring 1, and a stud 2 having an eye or perforation located beyond the ring, said stud being made to rotate but incapable of longitudinal motion in the ring, and said ring having a locking-face made to engage a pin or shank in the stud, substantially as described.

3. A two-piece securing device for scarf-pins comprising a ring 1, and a rotary non-sliding stud 2 having an eye or perforation for the insertion of a pin, said ring having an inclined face to lock or press said pin, substantially as described.

4. In a device for securing scarf-pins, or the like, the combination with a flat annular plate or base, of a stud rotatably supported in said plate or base but incapable of longitudinal motion therein and having an eye or perforation for insertion of a pin or other article parallel to the plane of said plate or base, the said plate being provided with a locking-incline having a toothed or dented face to lock against and secure the said article, substantially as described.

5. In a device for securing scarf-pins, or the like, the combination with a flat plate or base having a circular opening therein, of a stud rotatable in said opening but incapable of longitudinal movement and provided with an eye for insertion of a pin or other article, and a locking device on said plate or base to lock against and secure the said pin or other article, substantially as described.

In testimony whereof I have hereunto set my hand in the presence of two subscribing witnesses.

ABRAHAM ANZELEWITZ.

Witnesses:
WM. C. HAUFF,
E. F. KASTENHUBER.